Patented June 11, 1929.

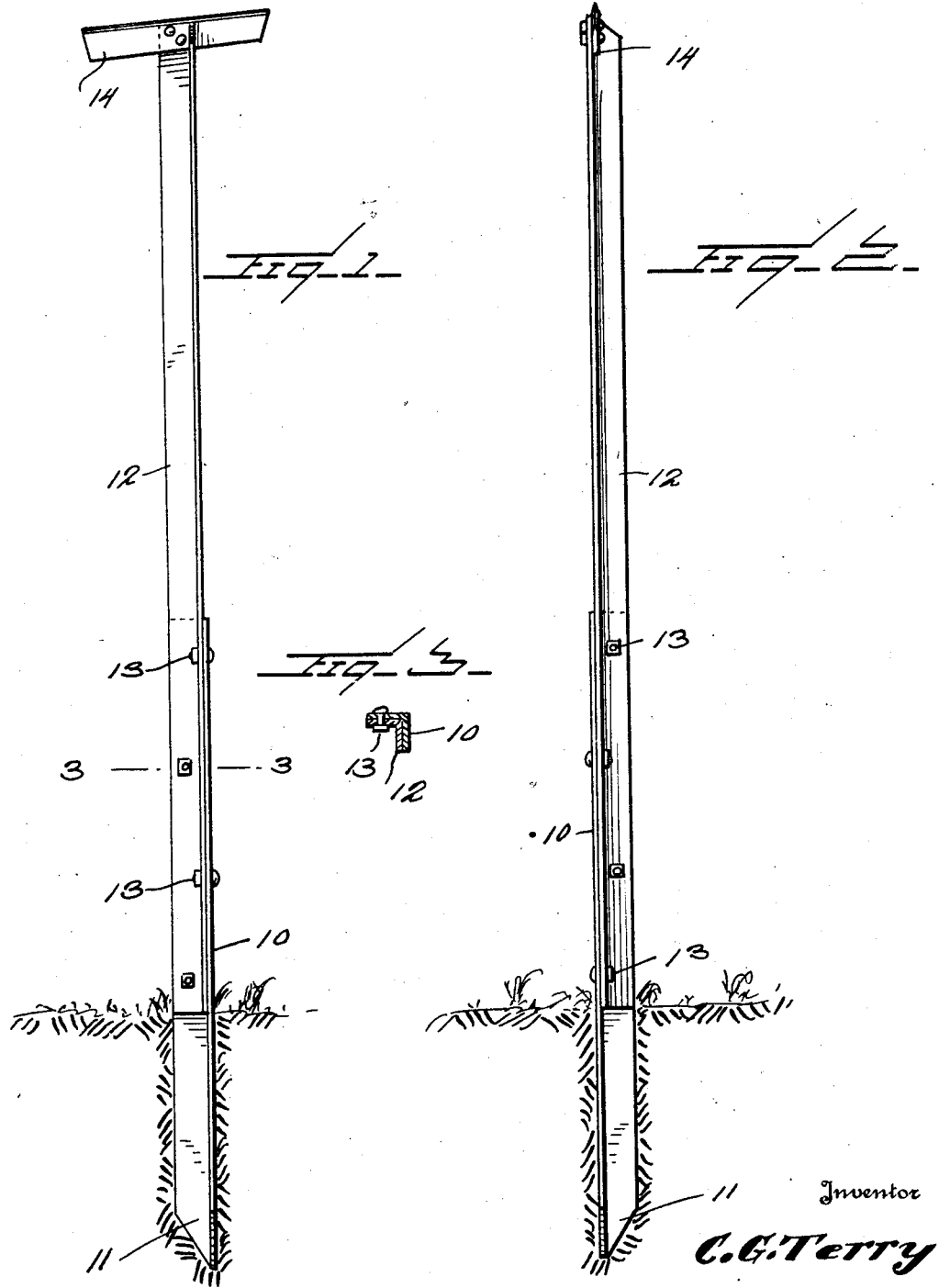

1,717,279

UNITED STATES PATENT OFFICE.

CLEMENT G. TERRY, OF EDWARDS, MISSOURI.

ANTI OWL, HAWK, AND CROW PERCH.

Application filed September 1, 1928. Serial No. 303,597.

This invention relates to devices for deterring owls, hawks, crows, and other large birds of prey which attack poultry, from alighting near a poultry yard just previous to swooping down upon the prey, and the general object is to provide a device for this purpose which comprises a post having thereon at its upper end a knife-like blade offering a rest or perch for the hawk, crow or owl, the sharp edge of a blade tending to cut the feet of the bird if it perches thereon and thus deterring the bird from alighting.

My invention is illustrated in the accompanying drawing wherein—

Figure 1 is an elevation of my anti-hawk perch;

Figure 2 is an elevation looking toward one end of the perch; and

Figure 3 is a section on the line 3—3 of Fig. 1.

It is the habit of birds of prey such as owls, hawks, crows and the like to alight on dead trees, snags, high fence posts and from these vantage points to swoop down on chickens and other poultry.

My device comprises a post designated 10, and which in actual practice will be about six and one-half feet long and preferably of channel or angle iron. This is sharply pointed as at 11 and is driven into the ground about two and one-half feet adjacent a fence row.

Attached to this post is an upright 12 which is also angular in cross section or channel shaped, or may have any other shape, and is provided with apertures by which bolts 13 may hold the upright against the projecting portion of the post. This upright is preferably about eight or ten feet long. Bolted across the top of the upright is the knife 14, the upper edge being sharp, and this knife is disposed so that one end of the knife is approximately one inch higher than the other end of the knife.

The hawks, owls or crows will look upon this knife as upon a perch and I have found by experience that they will usually fly toward the low side of the knife and thus as they are about to alight the knife will tend to cut the undersides of the feet. Thus when the hawk leaves the perch its weight and its starting spring will cause the knife to cut the muscles of the hawk's feet so that it will be unable to grasp the poultry.

Preferable, the posts will be painted black or red and it is to be understood that one or more knives 14 may be mounted upon a single post.

By placing a number of these posts with knives around the poultry yard, particularly if these perches are higher than the fence posts, these birds of prey will be prevented from attacking poultry, and I have found in actual practice that they will shortly give up attacking poultry in the particular yard so protected, and if most of the chicken yards in the neighborhood are so protected, hawks, owls, and other winged depredators will shortly leave the neighborhood.

What I claim is—

1. An anti-hawk perch, comprising an upright, and a knife bolted to the upright with its sharp edge upward, the knife extending transversely to the axis of the upright and beyond the same, one end of the knife being higher than the other end.

2. An anti-hawk perch, comprising a post section adapted to be embedded in the ground, an upright section adapted to be bolted to the post, and a knife attached to the upper end of the upright and extending transversely thereof, the knife having its upper edge sharpened.

3. An anti-hawk perch of the character described, comprising a post section angular in cross section, adapted to be driven in the ground, and an upright section angular in cross section to fit the post section, and be bolted thereto, and a knife attached to the upper end of the upright section and extending transversely thereof and having its upper edge sharpened.

In testimony whereof I hereunto affix my signature.

CLEMENT G. TERRY.